No. 878,115. PATENTED FEB. 4, 1908.
B. F. BROWN.
DUMPING CART.
APPLICATION FILED JUNE 5, 1907.
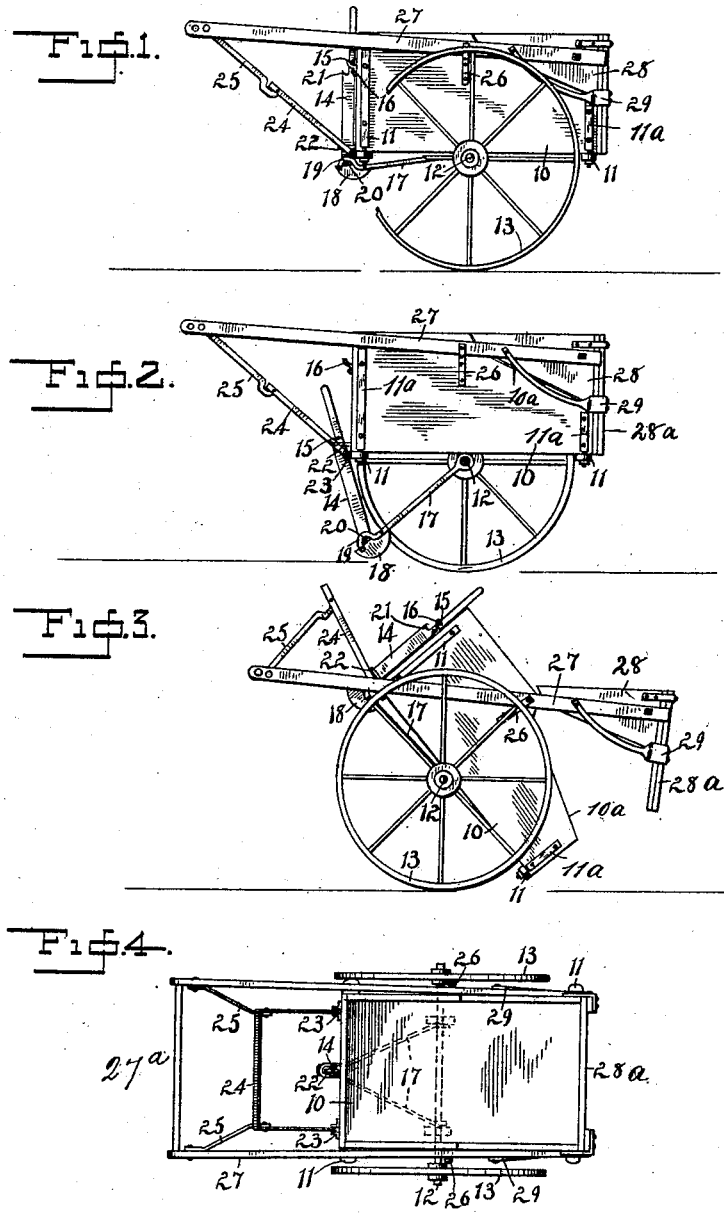

UNITED STATES PATENT OFFICE.

BENJAMIN F. BROWN, OF BRIDGETON, INDIANA.

DUMPING-CART.

No. 878,115.　　　　　Specification of Letters Patent.　　　　　Patented Feb. 4, 1908.

Application filed June 5, 1907. Serial No. 377,306.

*To all whom it may concern:*

Be it known that I, BENJAMIN F. BROWN, a citizen of the United States, residing at Bridgeton, in the county of Parke and State of Indiana, have invented certain new and useful Improvements in Dumping-Carts, of which the following is a specification.

My invention relates to dumping carts and the chief objects of my improvements are to produce a two wheeled cart adapted to be operated by hand that will permit tilting of the body by means of simple and easily understood mechanism for the purpose of discharging the load; to provide mechanism for retaining the body in various positions advantageous to its employment for holding, transporting and depositing its load; and to furnish means for strengthening and bracing the structure thus making it durable.

I accomplish the above and other objects by means of the appliance illustrated in the accompanying drawing which forms a part of this application, and in which—

Figure 1 is a side elevation of a hand cart embodying my improvements, a portion being broken away to reveal the parts beneath; Fig. 2 is a side elevation showing the body supported upon an adjustable leg, one of the ground wheels being removed; Fig. 3 is a side elevation showing the cart in dumping position, and Fig. 4 is a plan view.

Referring to the drawing in detail, the numeral 10 indicates a rectangular bed or body having the usual sides and front board, the sides being cut away toward the rear end to form an incline $10^a$. A cross piece 11 is located beneath each end of said body and is secured to the sides of the bed by straps $11^a$ to strengthen this part of the cart. The body is supported upon an axle 12 located somewhat to the rear of the center of gravity, and upon this axle are mounted ground wheels 13. As the center of gravity lies in front of the axle, to support the body in a horizontal position when at rest, I provide an adjustable leg 14 supported in the position shown in Fig. 1 by a pin 15 which projects laterally from each side of said leg and rests upon hooks 16, fixed to the front of the body, only one of said hooks appearing in the drawing. Links 17 are journaled on the shaft 12 beneath the body of the cart, project forward and are riveted to the upper margin of a semicircular shoe or foot 18. The front ends of said links are formed with bends 19, between which is received the lower end of the leg 14, and through this end passes a transverse pin 20 which engages the bends 19 of said links, thus forming a joint between the links and said leg. The upper portion of the leg is reduced in size and the shoulder thus formed is provided with a notch 21 which engages a loop 22, fixed to the lower edge of the front end of the cart body, when the leg is in the resting position shown in Fig. 2. The leg passes through said loop and is thus retained in proper relation with the coacting parts at all times.

To the front cross piece 11 are fastened clips 23 to which are pivotally secured the lower ends of a bail member 24. This bail is connected by levers 25 to handle-bars 27, which are pivoted to clips 26 secured to the sides of the cart body, and connected at their forward ends, by a hand-rod $27^a$, the bars 27 and hand rod constituting a framework to which are secured angular pieces 28, which complete the side boards of the body by meeting the incline $10^a$ when said bars are in the position relative to the body shown in Figs. 1 and 2. The handle-bars 27 and pieces 28 are connected at the rear by a tail-gate $28^a$ which extends below said pieces sufficiently to close the entire end of the body when the pieces 28 are in apposition with the margins $10^a$. A brace 29 is secured upon each side of the body extending from the tail gate to the handle-bars and bent inwardly near the lower end to form a guide to prevent lateral displacement of the said gate.

In using my improved dumping cart the various mechanisms are conveniently located within easy reach of the user who can thus manipulate them quickly and without the expenditure of much muscular effort. When the cart is in the position shown in Fig. 1 which may be termed the loaded position, the body will be nearly balanced upon the axle, the preponderance of weight, however, being upon the side of the handles which are manually held in the position shown. If it is desired to place the cart in the position shown in Fig. 2, the operator lifts the leg 14 to disengage the cross pin 15 from its hooks 16 and allows it to fall by gravity until the foot 19 strikes the ground. The handles are then slightly lowered to permit the loop 22 to automatically engage the notch 21 so that the weight will then rest upon the leg and axle.

The dumping position shown in Fig. 3 is a sequence of that illustrated in Fig. 1, and is brought about by breaking the joint between the bail 24 and the lever 25, which constitutes a principle that is commonly termed a toggle joint. This is done by taking hold of the cross bar of the bail and raising it up, the parts then taking the position shown, with the tail gate lifted and the floor of the cart body inclined so that the load will be discharged.

It is obvious that many changes may be made in the devices of my invention as herein disclosed without departing from the spirit and scope thereof, and it is also evident that the same principles of construction may be applied to carts drawn by animal power and I do not wish, therefore, to be limited to the precise details set forth.

Having thus described my invention what I claim as new, is:—

1. In a dumping cart, the combination with the body of the cart and handles attached thereto of a supporting member having link connection with the axle, a loop fixed to the body of the vehicle and engaging said member, and link connection between the said body and the handles.

2. In a dumping cart, the combination with the body, handle-bars pivoted to said body, and means for locking said handle bars against pivotal movement, of a supporting member having sliding engagement with a slotted arm connected to said body, links connecting said member with the axle, and a pin fixed in said member and adapted to engage a hook secured to the end gate.

3. In a dumping cart, the combination with the body, handle-bars pivoted thereto and an adjustable support, of toggle lever connections between the handle-bars and said body.

4. In a dumping cart, the combination with the body, handle bars pivoted thereto, and an end gate fixed to said bars, of toggle lever connections between the handle-bars and said body, said connections comprising a bail pivoted to the body, and a plurality of links pivoted to said handle-bars, and having pivotal connection with said bail.

5. In a dumping cart, the combination with the body, handle-bars pivoted thereto, and an end gate carried on said bars, of toggle jointed levers connecting the handle-bars with the body, and a supporting leg pivotally connected with levers mounted to turn on the axle, and having adjustable connection with said body.

In testimony whereof I affix my signature in the presence of two witnesses.

BENJAMIN F. BROWN.

Witnesses:
CHARLES ALEXANDER,
JULIUS J. BLAIR.